US 6,711,180 B1

United States Patent
Delesalle et al.

(10) Patent No.: US 6,711,180 B1
(45) Date of Patent: Mar. 23, 2004

(54) INTERFACE DEVICE BETWEEN AN ATM EQUIPMENT AND A TRANSMISSION CHANNEL HAVING A SYNCHRONOUS WIRELESS LINK

(75) Inventors: Christophe Delesalle, Perros-Guirec (FR); Patrick Tortelier, Clichy (FR)

(73) Assignee: France Telecom, Paris (FR)

( * ) Notice: Subject to any disclaimer, the term of this patent is extended or adjusted under 35 U.S.C. 154(b) by 0 days.

(21) Appl. No.: 09/580,471

(22) Filed: May 26, 2000

(30) Foreign Application Priority Data

Jun. 1, 1999 (FR) .............................. 99 06868

(51) Int. Cl.[7] .............................. H04J 3/24; H04B 7/00
(52) U.S. Cl. .................................. 370/474; 370/310.01
(58) Field of Search .............................. 370/465–469, 370/474, 463, 310.01, 310.02, 336, 337, 338, 328, 345, 470, 471; 714/748–750

(56) References Cited

U.S. PATENT DOCUMENTS

| | | | | |
|---|---|---|---|---|
| 5,684,791 A | * | 11/1997 | Raychaudhuri et al. | 370/310.2 |
| 5,991,281 A | * | 11/1999 | Hiramatsu | 370/474 |
| 6,064,649 A | * | 5/2000 | Johnston | 370/310.2 |
| 6,389,292 B2 | * | 5/2002 | Biedermann | 370/469 |
| 6,553,038 B1 | * | 4/2003 | Fukuda | 370/465 |

FOREIGN PATENT DOCUMENTS

| | | |
|---|---|---|
| EP | 0 755 164 | 1/1997 |
| WO | WO94/30028 | 12/1994 |

OTHER PUBLICATIONS

French Preliminary Search Report dated Feb. 16, 2000, Appl. FR 9906868.

* cited by examiner

*Primary Examiner*—Steven H. D Nguyen
(74) *Attorney, Agent, or Firm*—Gardner Carton & Douglas LLP

(57) ABSTRACT

The interfacing device handles asynchronous/synchronous adaptation and rate control between the ATM flows and the flows transmitted on the wireless interface. It transposes the ATM cells (53 octets) into packets which can be transmitted directly on the wireless interface (40 octets in the case of DECT). Similarly, at the receiving end, it reconstructs the original ATM cell flow on the basis of the packets received. In order to guarantee a certain transmission quality at the level of the wireless link, the device uses a data acknowledgement and retransmission mechanism adapted to the characteristics of the synchronous wireless channel. In order to fulfil the quality of service requirements of the various applications in terms of error rates and transmission delays, the device allows the data protection mechanism to be set for each ATM connection depending on the characteristics of the service.

8 Claims, 3 Drawing Sheets

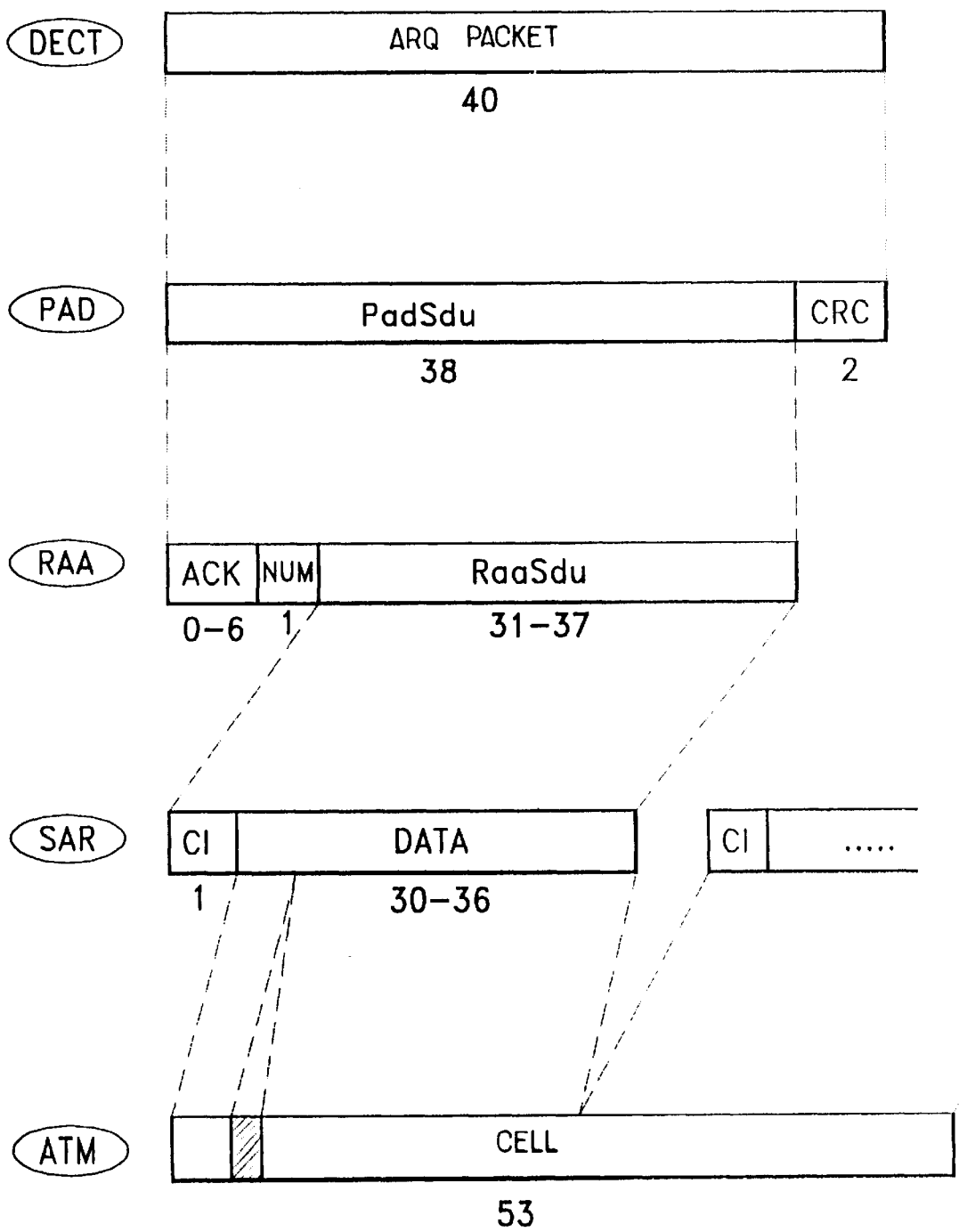

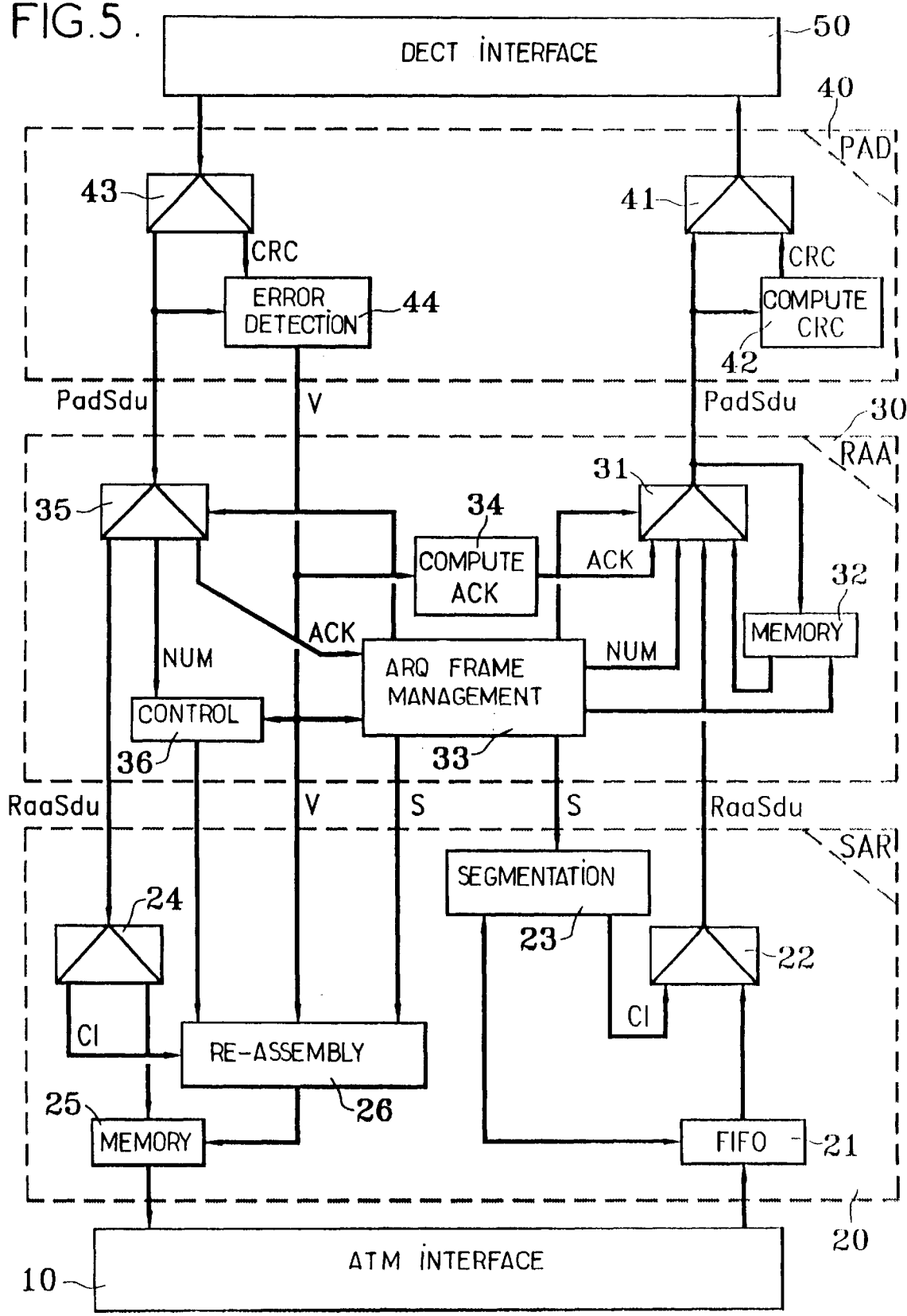

INTERFACE DEVICE BETWEEN AN ATM EQUIPMENT AND A TRANSMISSION CHANNEL HAVING A SYNCHRONOUS WIRELESS LINK

BACKGROUND OF THE INVENTION

The present invention relates to Asynchronous Transfer Mode (ATM) transmissions. It specifically relates to providing such transmissions on synchronous wireless links.

ATM is a communication mode which enables numerous flows having various rate and quality of service (delay and error rates) characteristics to be multiplexed. For example, video flows are the most demanding streams since they have a high speed and require a relatively low error rate (in the order of $10^{-6}$) with very strict delay requirements.

The basic data units transmitted in ATM are called cells and consist of packets made up of 53 octets, i.e. 48 octets of payload preceded by a 5-octet header.

Carrying a flow of ATM cells across a high-rate synchronous wireless interface gives rise to the following difficulties:

- the wireless interface of the synchronous type must be capable of supporting an asynchronous data flow (ATM),
- the size of the packets carried per timeslot on the radio interface does not generally correspond to that of the ATM cells,
- the error rates which can be expected on such a wireless interface are much higher than what is desired for multimedia applications,
- the delay incurred by the processing of the communication channel needs to be as short as possible in order to meet the strict requirements of certain applications in terms of transmission delay.

One of the types of wireless links to which the invention may be applied is that of DECT links (Digital Enhanced Cordless Telecommunications).

The DECT radio interface was originally devised as a wireless access to a fixed network supplying each user with a rate of 32 kbit/s without any protection, essentially intended for transmitting speech (the so-called non-protected mode). A protected mode also exists, which is intended for carrying data and which involves applying a block code for correcting errors, which has the disadvantage of requiring a complex decoding algorithm (decoding for BCH codes). By using a multi-slot allocation technique, the standard nevertheless permits symmetrical or asymmetrical high-rate wireless connections, each transmission direction of which is made up of a whole number of channels of 32 kbit/s without protection. Because of the simple channel coding, each wireless link offers an error rate of only approximately $10^{-3}$.

As a result, using such links as a reliable means of carrying ATM cells for a variety of applications seems to be somewhat problematic.

A main object of the invention is to overcome this difficulty.

SUMMARY OF THE INVENTION

Accordingly, the invention proposes a interface device between an ATM equipment and a transmission channel having a synchronous wireless link. The interface device is arranged to process:

ATM cells;

segmented data units, each containing either data extracted from at least one ATM cell and alignment data locating the starts of ATM cells in said extracted data or stuffing data if no ATM cells are to be transmitted;

numbered data units, each containing a segmented data unit and numbering data, at least some of the numbered data units further containing acknowledgement data; and protected data units having the size of packets which can be transmitted on the wireless link and each having a data field for containing a numbered data unit and an integrity verification field for containing an integrity verification code computed on the basis of said numbered data unit.

The device comprises, for the transmission of an ATM cell flow on the transmission channel:

a buffer memory receiving said ATM cell flow from the ATM equipment;

means for forming a first sequence of segmented data units, each containing data read from the buffer memory;

means for forming a second sequence of numbered data units, each containing a segmented data unit from the first sequence and numbering data generated in the sequence order of the segmented data units of the first sequence;

means for forming a third sequence of protected data units, each containing a numbered data unit from the second sequence and the integrity verification code computed for said numbered data unit, the sequence order of the protected data units in the third sequence being that of the numbered data units which they contain in the second sequence; and means for transmitting the third sequence of protected data units on the transmission channel.

The interface device further comprises, for receiving an ATM cell flow from the transmission channel:

means for receiving a fourth sequence of protected data units from the transmission channel;

transmission error detection means for re-computing an integrity verification code on the basis of the contents of the data field of each protected data unit in the fourth sequence, comparing the re-computed code with the contents of the integrity verification field of said protected data unit and indicating a transmission error for said protected data unit if the comparison reveals a difference;

means of forming a fifth sequence of numbered data units respectively extracted from the protected data units of the fourth sequence for which no transmission error has been indicated;

means for forming a sixth sequence of segmented data units respectively extracted from the numbered data units of the fifth sequence; and means for reconstructing an ATM cell flow output to the ATM equipment, on the basis of the data contained in the segmented data units of the sixth sequence, rearranged in accordance the numbering data contained in the numbered data units of the fifth sequence.

The means for forming the second sequence of numbered data units comprise means for inserting acknowledgement data in the numbered data units of the second sequence, whereby the acknowledgement data is indicative of the protected data units of the fourth sequence for which a transmission error has been indicated, and means for analysing the acknowledgement data contained in the numbered data units of the fifth sequence in order to insert in the second sequence of numbered data units repeats of numbered data units from the second sequence contained in protected data units of the third sequence for which the analysed acknowledgement data contained in the numbered data units of the fifth sequence indicate a transmission error.

Accordingly, the invention provides an adaptation layer between the ATM layer and the wireless link medium (MAC layer—Medium Access Control). It fulfils the following functions 1) Flow adaptation. The ATM flow transmission is asynchronous, whereas data transmission on the wireless interface is synchronous. Certain applications do not have specific rates (e.g. Internet) and can therefore transmit data at a rate higher than that permitted on the wireless medium. The interface device takes over the asynchronous/synchronous adaptation and rate control between the ATM flows and the flows transmitted on the wireless interface.

2) Data adaptation. The device transposes the ATM cells (53 octets) into packets that can be transmitted directly on the wireless interface (40 octets in the case of DECT). Similarly, at the receiving end, it reconstructs the original ATM cell flow from the packets received.

3) Data protection. In order to guarantee a certain transmission quality at the level of the wireless link, the device uses a data acknowledgement and retransmission mechanism (ARQ, Automatic Repeat reQuest) adapted to the characteristics of the synchronous wireless channel. A more common way of resolving the problem inherent in protecting data at the level of a wireless interface would be to protect the data to be transmitted using an error correction code. In a frequent situation where the channel is such that transmission errors occur by packets, the data has to be interleaved beforehand so that once the inverse operation has been performed at the receiving end (de-interleaving), the errors are dispersed and the decoder can operate correctly. There is a conflict between this operation, which is better the longer the interleaving depth, and the transmission delay requirement. Furthermore, error correction coding has the effect of reducing the useful rate since it adds redundancy to the data to be transmitted.

4) Providing Quality of Service (QoS). In order to match up to the quality of service requirements of the applications in terms of error rates and transmission delays, the device allows settings to be programmed for the data protection mechanism, for each ATM connection (service), depending on the characteristics of the service. The maximum permissible number of retransmissions and the type of acknowledgement of the ARQ mechanism can be used to offer the required QoS in terms of errors rates and delays.

BRIEF DESCRIPTION OF THE DRAWINGS

FIG. 4 is a diagram illustrating the structure of data units processed by the device.

FIG. 5 is a block diagram of an embodiment of the device proposed by the invention.

DESCRIPTION OF PREFERRED EMBODIMENTS

The invention is described below as applied to ATM cell transmission via a channel having a synchronous wireless link of the DECT type. The device uses an adaptation layer, referred to hereafter as ADAL (ATM-DECT Adaptation Layer).

The ADAL interface may be used under various circumstances in the high-rate context. In the example illustrated in FIG. 1, interface devices 1 are positioned between DECT type stations 2 providing high-rate links and portions 3 of an ATM network, whereby a wireless support may be offered to high-rate communications instead of a wire line in a fixed network.

Figure 2:
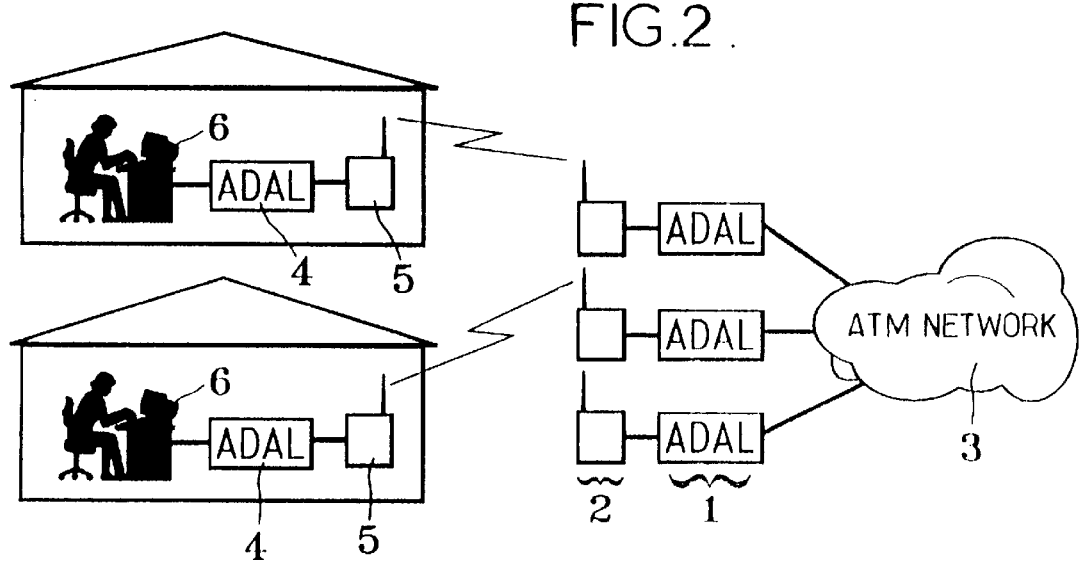

In the application illustrated as an example in FIG. 2, interface devices 1, 4 according to the invention are arranged at the network end on the one hand and at the user end on the other, offering high-rate access to fixed users linked to the ATM access network via a local wireless loop. At the network end, the interface devices 1 are installed between the fixed ATM network 3 and the wireless stations 2 managed by the operator. At the user end, the interface device 4 is located between a DECT terminal 5 and the ATM terminal 6 of the user.

Figure 3:
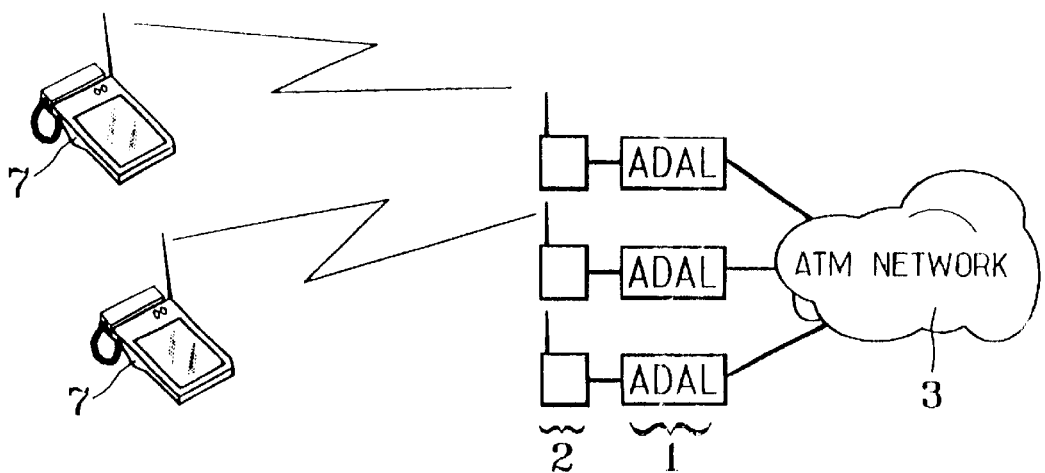

In the case of FIG. 3, the device 1 according to the invention provides high-rate wireless connections for users of a mobile network having multimedia mobile terminals 7. At the network end, the device 1 is installed in a manner similar to that illustrated in the example of FIG. 2. In general, an ADAL layer will also be provided in the protocols supported by the terminals 7.

Figure 1:
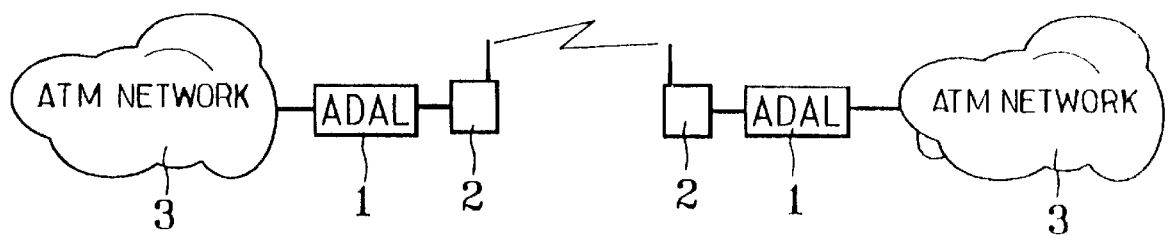
FIGS. 1 to 3 are diagrams illustrating several possible applications for which the interface device proposed by the invention may be used.

In each of the examples illustrated in FIGS. 1 to 3, the channel established between two devices operating the ADAL layer is limited to one DECT wireless channel. In practice, the wireless channel may form only a part of this transmission channel, being supplemented by other support channels (for example PCM, ATM, . . . ) capable of carrying the ARQ packets described below.

The communication protocol between two remote ADAL layers enables an ATM flow to be conveyed on a connection established between these two ADAL layers and using a wireless link. Hereafter, this connection will be referred to as an << ARQ connection>>. Packets transmitted at the rate of ARQ frames, referred to as << ARQ packets>>, circulate on this ARQ connection.

Since the wireless links used are of the DECT type, the ARQ packets are blocks of 40 octets generated between two ADAL layers. These blocks can be transmitted directly on the wireless interface at the level of the B-fields of the DECT frames in question via the wireless connection. An ARQ packet therefore corresponds exactly to a DECT packet.

The ARQ packets are emitted at the rate of ARQ frames corresponding to the transmission capacity of the DECT wireless connection used. Accordingly, each ARQ frame, made up of a fixed number of ARQ packets, is transmitted synchronously on a DECT frame, every 10 ms. If the DECT channel allocated to the ARQ connection is made up of n elementary timeslots per DECT frame for a rate of n×32 kbit/s, the ARQ frame will be made up of n ARQ packets emitted in the timeslots in question during the DECT frame.

The ADAL layer used in an interface device according to the invention is made up of three sub-layers:

a Protection And Detection sub-layer (PAD)

a Retransmission And Acknowledgement sub-layer (RAA); and a Segmentation And Reassembly sub-layer (SAR).

The structure of the data exchanged between the different layers is illustrated by the diagram of FIG. 4, whilst FIG. 5 shows how these layers are organised in one embodiment of the interface device according to the invention.

The MAC layer operated in the DECT interface 50 processes the ARQ packets forming the 40-octet DECT packets exchanged on the ARQ connection. The functions of this MAC layer include establishment/release of wireless connections, radio data transport and transmission of the DECT frame synchronisation to the PAD layer.

The ARQ packet forms a protected data unit comprising a 38-octet data field and a 2-octet integrity verification field.

The PAD sub-layer 40 controls the integrity of the ARQ packets as they are transported on the ARQ connection. It sets up these packets with the 38 octets of the numbered data unit PadSdu received from the RAA sub-layer supplemented by a cyclic redundancy checksum (CRC) inserted in the integrity verification field. The PAD sub-layer also handles the transmission and reception functions of the ARQ packets on a specific transmission medium, optionally linking it to the DECT interface 50, and transmits the 10 ms DECT synchronisation to the RAA sub-layer.

The elements of the interface device pertaining to the PAD sub-layer 40 are schematically illustrated in FIG. 5. The multiplexer 41 forms the ARQ packets by adding to the numbered data unit PadSdu received from the RAA sub-layer a CRC conventionally computed by a module 42 on the basis of the data contained in this unit of 38 octets.

At the receiving end, the demultiplexer 43 separates the numbered data unit received and the CRC received. An error detection module 44 re-computes the CRC on the basis of the data unit PadSdu received and compares it with the CRC received in order to detect any reception error which might have occurred in the binary data V sent to the RAA sub-layer.

In terms of protocol, three primitives are exchanged between the PAD and RAA sub-layers:

- a primitive BR (Block Request), sent by the RAA sub-layer to the PAD sub-layer to request transmission of a data block PadSdu of 38 octets supplied as a parameter of this primitive;
- a primitive BR (Block Indication) sent by the PAD sub-layer to the RAA sub-layer to indicate that it has received the data block PadSdu in question as well as the binary validity data V;
- a primitive PAD_SYNCH.ind sent by the PAD sub-layer to the RAA sub-layer in order to synchronise this latter with the start of the ARQ frames.

The RAA sub-layer 30 manages the synchronous transmission of the ARQ packets, the part relating to the retransmission and acknowledgement mechanism and absorption of the delay spread generated by retransmission. The numbered data unit PadSdu managed by the RAA sub-layer is made up of 38 octets (FIG. 4), comprising:

- optional acknowledgement data ACK, of a size variable between 0 and 6 octets,
- a packet numbering octet NUM used to retransmit the packets selectively,
- a payload part RaaSdu which corresponds to the segmented data unit issued by the SAR sub-layer. The size of the payload part RaaSdu integrated in each data unit PadSdu will depend on the possible acknowledgement to be inserted therein to ensure that the total length is always 38 octets.

The acknowledgement data ACK returned is computed ARQ frame by ARQ frame. It indicates how each ARQ packet of a same ARQ frame was received. In order to keep the size of the acknowledgements to a minimum, the ARQ packets are not acknowledged randomly but in a relative manner having regard to the sequence number in the ARQ frame (this sequence number is distinct from the numbering data NUM incorporated in the data units PadSdu). This means that the ARQ connections guarantee the non-loss, non-insertion and correct sequencing of the ARQ packets and that the protocol used at the transmitter level will retain in memory the composition of the ARQ frames transmitted.

The protocol may operate in two acknowledgement modes: positive or negative. In negative acknowledgement mode, it considers, by default, that the ARQ packets transmitted have been correctly received. In this mode, the transmission and the delay in the event that the acknowledgement data has not been received from the other party is limited but certain ARQ packets incorrectly received might end up not being transmitted. In positive acknowledgement mode, the situation is the reverse: the packets are considered as having been incorrectly received by default. This is more reliable but ARQ packets which were correctly received at the other end may sometimes be retransmitted.

The acknowledgement mode used may be selected when the ARQ connection is established. The negative mode is better suited to high rates and stringent delay requirements but implies a higher error rate than the positive mode.

The acknowledgements are transmitted at the level of the wireless interface within the band, i.e. they are integrated directly in the flow of payload data circulating between the two peer ADAL interfaces. The fact of carrying the acknowledgement data in the B-fields of the DECT frames ensures that they are carried in all the phases of the communication, including any handover.

The acknowledgement data is inserted at the beginning of the first ARO packet of each ARQ frame. Accordingly, the part available for the segmented data units RaaSdu in the first packet of each frame is reduced by the size occupied by the acknowledgement data. This being the case, the RM sub-layer issues a request to the SAR sub-layer to sent it a data unit RaaSdu whose size is 37 octets minus the size of the acknowledgement field. For the other ARQ packets in the frame, the RAA sub-layer issues a request to the SAR sub-layer for data units RaaSdu of 37 octets. In order to limit the bandwidth occupied by acknowledgement data, the size of this data varies between 1 and 6 octets and is computed depending on the rate reserved for the connection in the opposite direction. The minimum number of bits needed to acknowledge an ARQ frame (in blocks of 8 bits to obtain a whole number of octets) is the number of ARQ packets forming the ARQ frame received.

The acknowledgement data bits corresponding to the acknowledgement of ARQ packets are set to 1 if the ARQ packet was correctly received and to 0 otherwise. The payload bits, corresponding to the acknowledgement of a packet whether correctly received or not, are aligned on the right relative to the octets reserved for the acknowledgement data.

The ARQ frames may have a single or double acknowledgement. The double acknowledgement consists in that the acknowledgement data inserted in the first packet of each ARQ frame acknowledges two separate ARQ frames received in the opposite direction and in that each ARQ frame received is acknowledged by two ARQ frames transmitted in the opposite direction.

The double acknowledgement contained in each transmitted ARQ frame relates two ARQ frames received, consecutive or not. The gap between these two ARQ frames received is a parameter which can be controlled when the ARQ connection is established depending on the application requirements and the radio characteristics of the environment.

The single acknowledgement is not transmitted with more protection than the user data. Using a double acknowledgement therefore increases security for the acknowledgements.

The double acknowledgement increases the retransmission time and bandwidth occupancy. The choice as to type of acknowledgement, single or double, and the corresponding parameters can therefore be used as a means of adjusting the quality of service offered.

Another parameter linked to the quality of service is the maximum number of retransmissions possible for a given packet. At the transmitter end, this number is used to limit the number of times a given ARQ packet is retransmitted. It also allows the receiver to determine the maximum time that transmission of an ARQ packet can take. So as not to clog up the band for no reason, empty ARQ packets are not retransmitted.

In the RAA sub-layer 30 (FIG. 5), the multiplexer 31 assembles the numbered data units, which are supplied to the PAD sub-layer 40 and stored temporarily in a memory 32. The module 33 which manages the ARQ frames takes over the synchronisation functions in the RAA sub-layer. It controls the multiplexer 31 so that the acknowledgement data ACK, computed by a module 34 on the basis of the validity binary data V received from the PAD sub-layer PAD 40, is inserted at the start of the first packet of each ARQ frame. The module 33 also issues the numbering data NUM on 8 bits which allows the transmitted data unit to be located relative to the sequence as a whole.

The module 33 also receives from the multiplexer 35 the acknowledgement data ACK received in the opposite direction. It analyses this data in order to control the process of reading from the memory 32 each packet to be retransmitted, i.e. each packet for which an acknowledgement bit set to 0 was received, or for which the acknowledgement data was incorrectly received (which the validity binary data V indicates for the first packet of the ARQ frames received) if acknowledgement is being operated in positive mode. Any packet read in the memory 32 is sent to the multiplexer 31 rather than a packet picked up from the SAR sub-layer.

In order to limit retransmission delays, the system is set up so that, in each frame, any packet retransmissions are dealt with first, starting with those whose number NUM is the earliest, and the new packets whose payload parts are requested from the SAR layer are not formed until all the retransmissions have been completed.

In the receiving direction, the demultiplexer 35 separates the segmented data units RaaSdu, the numbering data NUM and, for the first packet of each ARQ frame, the acknowledgement data ACK supplied to the module 33. The control module 36 processes the numbering data NUM and the validity data V relating to the packets received in order to control re-assembly of the ATM flow. If a numbered packet was correctly received, a command is issued to write its payload part into the ATM flow to be sent. Otherwise, the write procedure is inhibited until the packet has been received incorrectly a number of times equal to the maximum number of retransmissions stipulated when the connection was established.

In terms of protocol, the interface between the RAA and SAR layers comprises three primitives:

a primitive DR (Data Request) sent by the RAA sub-layer to the SAR sub-layer to request transmission of a segmented data unit RaaSdu of a size S depending on its position in the ARQ frame;

a primitive DG (Data Granted), sent by the SAR sub-layer to the RAA sub-layer in response, supplying a data unit to be transmitted; and a primitive DI (Data Indication), sent by the RAA sub-layer to the SAR sub-layer to indicate reception of a data unit RaaSdu, of a size S depending on its position in the ARQ frame received, and validity data indicated by the bit V.

The SAR sub-layer 20 handles the segmentation and re-assembly of the ATM cell flow for despatch on the wireless link. It handles the data adaptation part of the ARQ protocol: decomposition/recomposition of the ATM flow and supply of the payload integrated in the ARQ packets. The SAR sub-layer manages the segmented data units RaaSdu, the size of which varies from 31 to 37 octets for the reasons explained above.

These data units (FIG. 4) are made up of one octet corresponding to alignment data CI locating the data relative to the sequence of ATM cells, followed by a field of payload data of variable size (30 to 36 octets) extracted from the transported ATM cell flow.

The SAR sub-layer 20 retains the ATM cell flow supplied by the ATM interface 10 in a buffer memory and transmits it in blocks to the RAA sub-layer when requested to do so by the latter. A multiplexer 22 adds to the data extracted from the ATM cells and read from the buffer memory 21 the alignment data CI issued by a segmentation module 23. This module 23 receives the requests for data blocks of a size S from the RAA sub-layer and issues a command for this data to be extracted from the buffer memory 21 accordingly. The alignment data CI is updated in accordance with the position of the current data relative to the boundaries between successive ATM cells. By way of example, the alignment data octet CI may be broken down into a two-bit field TYP, indicating the type of block, and a 6-bit location field SOC coded as follows:

TYP=00, SOC=000000: non-assigned block, i.e. the buffer memory 21 does not contain any data at the time of a request from the RAA sub-layer;

TYP=10: partially assigned block, i.e. containing no payload up to a position, ranging between 1 and 35 octets, denoted by the field SOC;

TYP=11, SOC=111111: the data part of the RaaSdu block extends across a single ATM cell which does not start in this RaaSdu block;

TYP=11, SOC=000000: the data part of the RaaSdu block commences right at the start of an ATM cell; and TYP=11, SOC≠111111 and 000000: the data part of the RaaSdu block spans two successive cells, the position of the beginning of the second cell, ranging between 2 and 36 octets, being indicated by the field SOC.

When the module 33 managing the ARQ frames reads a packet to be retransmitted in the memory 32 of the RAA sub-layer, it examines the alignment data octet CI contained in this packet to inhibit its retransmission if it is a non-assigned block, in order to avoid any useless delays.

In the part pertaining to the SAR sub-layer 20, the interface device also has a demultiplexer 24 to which the segmented data units RaaSdu received from the RAA layer 30 are applied, and which extracts the alignment data CI and the payload therefrom. A re-assembly module 26, controlled by the module 36 of the RAA layer, receives the extracted alignment data CI, the validity bit at V and the indication S as to the size of the payload part of the current packet. Depending on this information, the re-assembly module 26 issues a command to write the payload to the appropriate locations of a memory 25 in which the ATM cells are reconstructed before being sent to the ATM interface 10. The module 26 may also indicate to the ATM interface which cells are likely to contain errors on the basis of the validity bits V.

Two modes of carrying ATM cells may be used in the ADAL interface: a normal mode and an optimised mode.

In normal mode, the entire contents of the ATM cells are written to the buffer memory 21 to be inserted in the segmented data units RaaSdu and in the ARQ data packets, except for the octet HEC carrying the ATM header error detection code. Consequently, the 48 octets of the payload part of each cell are transported along with the first four octets of the header. Once transported, the 52-octet cells are reformatted by the module 26 into real 53-octet ATM cells after inserting the HEC octet, which is initialised to 0 by default.

The optimised mode permits to cope with the relatively low rates available on the DECT wireless interface. In this mode, the headers of the ATM cells are reduced to two octets, namely 4 bits for the VPI, 8 bits for the VCI and 4 bits for the PT/CLP field (Payload Type/Cell Loss Priority). Other bits are thus removed in addition to the HEC octet, namely certain virtual path and virtual channel identifier bits VPI/VCI and the GFC bits (Generic Flow Control). After they have been transported across an ARQ connection, the reduced cells are reformatted into complete cells by the module 26. The GFC fields, the HEC and the other non-transported parts of the ATM header are initialised to 0 by default during this operation. Using these reduced cells has the effect of limiting the number of bits which may be used to identify the virtual connections and the loss of information contained in the GFC field. The presence of the PT/CLP fields in the header of the reduced cells allows the ATM cells to be transported in the ML5 format.

Normal mode allows a gain of one octet out of 53, which corresponds to a gain of 1.9% on the net bandwidth available for the user applications. The optimised mode increases this gain to 5.7%

What is claimed is:

1. An interface device between an ATM equipment and a transmission channel having a synchronous wireless link, the interface device being arrange to process:

ATM cells;

segmented data units, each containing either data extracted from at least one ATM cell and alignment data locating starts of ATM cells in said extracted data or stuffing data if no ATM cells are to be transmitted;

numbered data units, each containing a segmented data unit and numbering data, at least some of the numbered data units further containing acknowledgement data; and protected data units having the size of packets which can be transmitted on the wireless link and each having a data field for containing a numbered data unit and an integrity verification field for containing an integrity verification code computed on the basis of said numbered data unit;

the interface device comprising, for the transmission of an ATM cell flow on the transmission channel:

a buffer memory receiving said ATM cell flow from the ATM equipment;

means for forming a first sequence of segmented data units, each containing data read from the buffer memory;

means for forming a second sequence of numbered data units, each containing a segmented data unit from the first sequence and numbering data generated in the sequence order of the segmented data units of the first sequence;

means for forming a third sequence of protected data units, each containing a numbered data unit from the second sequence and the integrity verification code computed for said numbered data unit, the sequence order of the protected data units in the third sequence being that of the numbered data units which they contain in the second sequence; and means for transmitting the third sequence of protected data units on the transmission channel;

the interface device comprising, for receiving an ATM cell flow from the transmission channel:

means for receiving a fourth sequence of protected data units from the transmission channel;

transmission error detection means for re-computing an integrity verification code on the basis of the contents of the data field of each protected data units in the fourth sequence, comparing the re-computed code with the contents of the integrity verification field of said protected data unit and indicating a transmission error for said protected data unit if the comparison reveals a difference;

means for forming a fifth sequence of numbered data units respectively extracted from the protected data units of the fourth sequence for which no transmission error has been indicated;

means for forming a sixth sequence of segmented data units respectively extracted from the numbered data units of the fifth sequence; and means for reconstituting an ATM cell flow output to the ATM equipment, on the basis of the data contained in the segmented data units of the sixth sequence, rearranged in accordance the numbering data contained in the numbered data units of the fifth sequence, wherein the means for forming the second sequence of numbered data units comprise means for inserting acknowledgement data in the numbered data units of the second sequence, whereby the acknowledgement data is indicative of the protected data units of the fourth sequence for which a transmission error has been indicated, and means for analysing the acknowledgement data contained in the numbered data units of the fifth sequence in order to insert in the second sequence of numbered data units repeats of numbered data units from the second sequence contained in protected data units of the third sequence for which the analysed acknowledgement data contained in the numbered data units of the fifth sequence indicate a transmission error.

2. A device as claimed in claim 1, wherein the numbered data units of the second sequence are grouped in frames, as are the protected data units of the third and fourth sequences, and wherein acknowledgement data relating to a frame of the fourth sequence is inserted in the first numbered data unit of each frame of the second sequence.

3. A device as claimed in claim 2, wherein the means for analysing the acknowledgement data are arranged to cause the numbered data units of a frame from the second sequence to be repeated if the error detection means indicates a transmission error for the first protected data unit of a frame of the fourth sequence containing acknowledgement data relating to said frame of the second sequence.

4. A device as claims in claim 2, wherein the means for inserting acknowledgement data are arranged to insert the acknowledgement data, indicative of the protected data units of a frame of the fourth sequence for which a transmission error has been indicated, in the first numbered data units of the least two frames of the second sequence.

5. A device as claimed in claim 1, wherein the acknowledgement data occupies a number of bits depends on the available rate on the wireless link.

6. A device as claimed in claim 1, wherein a header error detection coding octet is removed from the data extracted from each ATM cell to be contained in a segmented data unit.

7. A device as claimed in claim 6, wherein other bits of the header of each ATM cell are removed from the data extracted from each ATM cell to be contained in a segmented data unit, the other removed bits comprising virtual path and virtual channel identifier bits and/or flow control bits.

8. A device as claimed in claim 1, wherein the maximum number of times a numbered data unit from the second sequence can be repeated is a programmable parameter.

* * * * *